(12) United States Patent
Collinson

(10) Patent No.: US 12,510,399 B2
(45) Date of Patent: Dec. 30, 2025

(54) SILO CONTENT MONITORING SYSTEM

(71) Applicant: E COLLINSON & CO. LTD., Preston (GB)

(72) Inventor: Samuel Collinson, Preston (GB)

(73) Assignee: E COLLINSON & CO. LTD., Lancashire (GB)

( * ) Notice: Subject to any disclaimer, the term of this patent is extended or adjusted under 35 U.S.C. 154(b) by 0 days.

(21) Appl. No.: 18/866,140

(22) PCT Filed: May 10, 2023

(86) PCT No.: PCT/GB2023/051230
§ 371 (c)(1),
(2) Date: Nov. 15, 2024

(87) PCT Pub. No.: WO2023/222996
PCT Pub. Date: Nov. 23, 2023

(65) Prior Publication Data
US 2025/0172428 A1     May 29, 2025

(30) Foreign Application Priority Data
May 18, 2022  (GB) .................................. 2207293

(51) Int. Cl.
  *G01G 17/04*  (2006.01)
  *G01G 3/14*   (2006.01)
(52) U.S. Cl.
  CPC ........... *G01G 17/04* (2013.01); *G01G 3/1402* (2013.01)
(58) Field of Classification Search
  CPC ...... G01G 3/1402; G01G 17/04; G01G 21/23; G01G 21/28
  See application file for complete search history.

(56) References Cited

U.S. PATENT DOCUMENTS

| 8,581,734 | B2 |   | 11/2013 | Ozâmiz Fortis |
| 10,677,637 | B1 | * | 6/2020  | Von Muenster ... A01D 41/1272 |

(Continued)

OTHER PUBLICATIONS

The International Search Report (ISR) with Written Opinion for PCT/GB2023/051230 dated Jul. 31, 2023, pp. 1-9.

*Primary Examiner* — Randy W Gibson
(74) *Attorney, Agent, or Firm* — McDonnell Boehnen Hulbert & Berghoff

(57) ABSTRACT

A silo content monitoring system (100) for a silo (102) fitted with a rotatable discharge auger (114, 118). The system has a strain gauge (150) affixed to at least one of the support struts (124) supporting the silo shell (104) above the ground. The strain gauge output (1500) is proportional to the compressive strain in the said silo strut (124), and is used to obtain an estimate of the silo's weight, and hence the weight of the silo's content, by subtracting a tare value. The system also has a motion sensor (152), which detects rotation of the discharge auger (118). A central processor of the system calculates: during a night time interval, an overnight silo content weight measurement (1502) based on the strain gauge (150) readings; and during a daytime interval, an estimated dispensed weight by subtracting a certain weight for each rotation or part-rotation of the auger (118). By doing this, the system (100) is able to display, on a read-out device (158), a dead reckoning silo content weight estimate (174), which is the overnight silo content weight measurement, minus the estimated dispensed weight since the last overnight silo content weight measurement.

19 Claims, 4 Drawing Sheets

(56) References Cited

U.S. PATENT DOCUMENTS

| | | | |
|---|---|---|---|
| 11,650,093 B2 * | 5/2023 | Von Muenster | G01G 13/28 177/1 |
| 2011/0220677 A1 * | 9/2011 | Bertolani | G01G 11/086 222/1 |
| 2012/0099948 A1 * | 4/2012 | Bump | B65G 69/00 414/21 |
| 2021/0404303 A1 | 12/2021 | Hindman et al. | |

* cited by examiner

SILO CONTENT MONITORING SYSTEM

CROSS-REFERENCE TO RELATED APPLICATIONS

The present application is a U.S. National Phase of International Application No. PCT/GB2023/051230, filed on May 10, 2023, which claims priority to United Kingdom Patent Application No. GB 2207293.8, filed on May 18, 2022, which is incorporated herein by reference in its entirety.

This invention relates to a content monitoring system for a silo.

One type of silo is a tall tower on a farm that is used to store grain, feed, or other granular material. Most farms have at least one silo, the contents of which are needed for the effective day-to-day running of farm operations. It is therefore important that a sufficient supply of grain, feed or other granular material is maintained, so as to avoid inopportunely running out. Conversely, storing excessive amounts of grain, feed or other granular material can result in ageing or degradation. A need therefore exists for farmers to be able to monitor the contents of their silos for operational reasons (e.g., recording the amount of feed consumed for livestock health monitoring purposes), as well as for inventory control.

A silo typically comprises a generally tubular shell, which is supported above ground level by a support frame comprising a silo ring and a plurality of struts. A hopper funnels the grain, feed or other granular material stored within the silo towards an outlet aperture, which typically has a control valve fitted thereto and a discharge tube. The contents of the silo can be discharged using gravity by opening the control valve. More commonly however, the contents of the silo are discharged by using an auger inside the discharge tube, which draws the grain, feed, or other granular material from the hopper, along the discharge tube, in a more controlled fashion. The shell is closed off at its top, to protect the contents of the silo, by a flat, domed, or part-conical lid, which also has a closable inlet aperture through which the silo can be filled or topped-up. Due to their durability and "low-tech" nature, silos routinely have a useable duty cycle of several decades, and are not, therefore, frequently bought or replaced. In other words, a silo represents a significant investment for a farmer, who will generally be reluctant to change the silo for a newer model unless absolutely necessary.

New silos are nowadays routinely fitted with load cells placed in-line with one or more of their supporting struts. This enables the weight of the silo to be accurately measured, and hence the weight of the contents of the silo—by subtracting the total weight from a tare weight, (the empty weight of the silo). To counteract against the effects of windage, load cells are typically interposed at several, or all, of the floor-strut connections, so that the effects of windage or uneven distribution of the silo's contents can be factored-out.

However, for existing or already-installed silos, the options are somewhat limited. It is possible to crane an existing silo off the ground to place load cells under its struts, before bolting it back down into position. This is an expensive and risky procedure, especially for older silos, which may be corroded in places, in addition to the fact that due to the design of a silo, the lift needs to take place from the bottom as the structure is designed for compression, rather than tension loads. Moreover, the silo usually needs to be emptied and is unusable during the "upgrade" process. Even when done, there can be some aspects of adaptation that need to be undertaken to the silo's structure for compatibility with the retrofitted load cells, and there can also be degraded weighing accuracy due to silo-to-silo variations on older models, as opposed to the "designed for a specific system" nature of new-build silo weighing systems.

An alternative retrofit weighing system enables the silo to be maintained in situ, with strain gauges fitted to one or more of its support struts. On its face, strain gauges and load cells ought to be interchangeable, but for the reasons stated below, this is not the case at all. The primary reason is that a load cell is an in-line (serial) device, that is interposed between the structure of the silo and a fixed object, namely the concrete pad upon which the silo sits. There is therefore a direct relationship between the load cell output and the weight bearing down upon it. A strain gauge, on the other hand, is a parallel device, which measures the relative compression of a silo strut caused by weight being added to the silo. As more weight is added, so the struts are compressed, and the micro-strain values obtained from the strain gauges can be used in a Hookean-cum-solid mechanics type equation to derive the difference in weight applied from one moment to the next. However, it is not only on-axis compression forces that alter the dimensions of a metal strut, but there are also many other factors too, such as bending strain, vibration caused by windage or sound waves, thermal expansion and contraction, sensor drift and so on, which means that, in reality, there is often only an indirect relationship between strain gauge output and the actual weight of the silo.

Various systems have been developed which seek to address the shortcomings of strain gauge-based systems, including providing thermal and light insulation to the struts; active climate control in the vicinity of the sensors, the use of multiple strain gauges at various positions; weather-based correction algorithms (to counteract the effects of wind, rain, direct sunlight, and air temperature) and so on. Whilst some of these systems have proved to be somewhat effective, they tend to be very complicated and expensive to install, and require regular maintenance, updates, and data connections to obtain the real-time data they need for effective operation.

A need therefore exists for a solution to the problem of silo weighing, which can be easily retrofitted by unskilled persons, and which provides an adequate balance between the often-competing requirements of cost, complexity, accuracy, and reliability. The present invention aims to provide such a solution.

Aspects of the invention are set forth in the appended independent claim or claims. Preferred and/or optional features of the invention are set forth in the appended dependent claims.

According to an aspect of the invention, there is provided a silo content monitoring system for a silo that comprises: a shell; a hopper; an outlet aperture located at or towards the base of the hopper; a discharge tube connected to the outlet aperture; a rotatable auger located within the discharge tube; and a plurality of support struts for supporting the shell, hopper and outlet aperture above ground level, the silo content monitoring system being characterized by: a strain gauge affixed to at least one of the support struts; a motion sensor adapted to detect rotation of the auger relative to the discharge tube; and central processing unit comprising: a calculating means; a system clock; an input/output interface connected to the strain gauge, the motion sensor and to a read-out device, wherein the central processing unit is adapted, in use, to: during a night time interval, to monitor an output of the strain gauge to ascertain an overall weight of the silo, subtract a tare weight from the overall weight to obtain an overnight silo content weight measurement; during a daytime interval, to monitor an output of the motion sensor and for each rotation or part-rotation of the auger, calculate an estimated dispensed weight; and to output, via the read-out device, a subtractive silo content weight estimate being the overnight silo content weight measurement, minus the estimated dispensed weight.

The invention therefore provides somewhat of a hybrid solution that makes the most of two separate systems. The strain gauges are used during or throughout a night time period when the effects of thermal expansion on the struts has been found to be minimal. Further, by averaging the strain gauge readings during or throughout the overnight period, it is possible to obtain a reasonably accurate measurement, from which a good estimate of the silo weight can be obtained. This is best accomplished by taking multiple readings overnight from the strain gauges such that, overall, the effects of windage, heating/cooling, vibrations, etc are cancelled out arithmetically. Then, during daylight hours, when the effectiveness and/or reliability of the strain gauges is degraded, the invention switches to an alternative estimation method, namely measuring the amount of silo content decanted throughout the day. This estimate is obtained by counting the number of revolutions of the auger, which corresponds, quite reliably, to the weight of material decanted from the silo. By subtracting the amount of material decanted from the overnight weight reading, a "dead reckoning" estimate of the instantaneous contents of the silo can be obtained.

At the end of the daytime period, the system reverts back to using the strain gauge or strain gauges to estimate the weight of the silo and this can be used to cross-check the dead reckoning estimate from the auger rotation. If there is a significant difference between the dead reckoning estimate and the actual weight obtained by the strain gauge, then a correction can be built in which adjusts the dead reckoning multiplier per revolution, or per part-revolution of the auger for the following day or days. By continuing to use the system over a number of days, the accuracy of the system improves to such an extent that the overall accuracy and reproducibility of the system is more than adequate for day-to-day use.

In order to distinguish between "daytime" and "night time", the invention has a system clock. This is used to keep track of time using an oscillator and by occasionally synchronizing the system clock to an actual day, for example by using an internet time server. Other methods may be used, for example, by using a real-time clock (RTC), which periodically synchronizes an onboard clock with internet time or another time server; or a radio-control clock (RCC), which automatically synchronizes to a time code transmitted by a radio transmitter connected to a time standard, such as an atomic clock. Dedicated terrestrial long wave transmitters are available, which emit time codes that can be demodulated as reliable time stamps. Other methods of obtaining the actual time include receiving the time stamp from GPS signals and/or a time stamp from a mobile telephony signal.

The system comprises at least one strain gauge affixed to at least one of the support struts of the silo. However, it is also possible to affix a plurality of strain gauges to a respective plurality of support struts. This can be useful for factoring-out the effects of uneven content distribution within the silo. However, by increasing the number of strain gauges, the overall cost of the system to install is naturally increased, so a trade-off has to be sought between the minimum number of strain gauges (one) that are required to obtain a measurement, versus the maximum number of strain gauges that are required to obtain the best accuracy. In practice, however, a single strain gauge has proven to be more than accurate for most purposes, but this will naturally depend on the geometry of the silo because some silos have a tendency to preferentially fill to one side or another.

Where more than one strain gauge is used, the central processing unit is suitably adapted to use a function of the outputs of the strain gauges to obtain a single, overall reading. The function can be a geometric or arithmetic mean, or some other form of regression.

The motion sensor of the invention can be of any suitable type, such as an encoder affixed to a drive shaft of the auger, or to a rotor of a motor driving auger. The rotation of the drive shaft/motor can thus be measured directly to obtain the number of rotations of the auger during a given period. The movement of the auger can also be measured indirectly, for example, by using a current sensor connected to a power cable of the motor that drives the auger. In this case, when the current is zero or substantially zero, it can be assumed that the motor is not driving the auger, but when the current increases, this indicates movement of the auger. A relationship between the current and speed of the auger can be used to ascertain the number of revolutions of the auger based on the time-current profile from the current sensor. In other embodiments, the motion sensor comprises an induction sensor affixed to the exterior of the discharge tube, which detects rotation of the auger as its metal parts move past it. An induction sensor has the advantage of being easily retrofittable to a discharge tube, for example, using an adhesive, a clip, a strap, etc. This permits the motion sensor to be easily retrofitted by an unskilled user.

The invention is predicated on having two separate periods within every given day, namely a night time period and a day time period. These can be pre-set times, for example, 7 pm to 5 am being "night time" or they could be based on, for example almanac data for a given location. Indeed, tables of sunrise and sunset times are available, which if the central processing unit is configured to know the location of the silo, it can automatically populate the sunset and sunrise times for each day of the year based on that data. This enables the system to operate automatically and to maximize/optimize the number of overnight readings from the strain gauge. Specifically, if the central processing unit knows exactly what time sunrise and sunset are on a given day, then it can avoid taking strain gauge readings during daylight hours where thermal expansion/contraction may be detrimental to the efficacy of the strain gauges. It can also maximize the number of valid strain gauge readings throughout the actual night time period, rather than simply truncating this overnight measurement period to a shorter one, for example, 10 pm to 4 am.

The provision of a real-time clock (RTC) within the system is important for keeping track of the day of the year and the time of day so that the appropriate transition from overnight strain gauge measurements to daytime dead reckoning can be implemented.

As mentioned previously, the silo content monitoring system of the invention has a central processing unit that is suitably adapted, in use, to recalibrate the estimated dispense rate per rotation or part-rotation of the auger. This can be accomplished, for example, by ascertaining a difference between overnight silo content weight measurements on subsequent days, ascertaining a total number of rotations, or part-rotations of the auger between the said first day and second day; and then by dividing the overnight silo weight measurement difference by the number of rotations, or part-rotations of the auger to obtain a calibrated value of the weight dispensed per rotation or part-rotation of the auger. Once a calibrated value has been obtained, it can be used in subsequent days to improve the accuracy and/or reliability of the dead reckoning system.

Ideally, the recalibration system works on a 2-to-5-day period so that sufficient averaging can be used. However, by limiting the averaging period to a few days, or up to 5 days, the effects of changes in the material within the silo can be factored out.

For example, it may be the case that the compaction of the material within the silo varies depending on its fill content and this may become apparent over the course of a week or so. By maintaining a rolling average that only goes back a few days, it avoids the possibility of the calibrated value oscillating around the actual value. More importantly, however, if the silo is re-filled or topped-up, then various factors may affect the effective density/compaction of the silo content. For example, there may be a different water content or packing ratio. Indeed, the material within the silo may become stratified by adding slightly different material on top of existing material. By limiting the rolling average to a few days, such as between 2 to 5 days, the effects of this can be mathematically factored out.

Preferably, the rolling average is reset if the overnight silo content weight measurement on a given day is greater than the overnight silo content weight measurement on the proceeding day. In practical terms, the only way that the silo weight can increase throughout the day is if a top-up or refill has taken place. If the rolling average were not reset, then the calibration value would go negative to try to account for the fact that the weight has gone up even though material has been decanted. The resetting of the rolling average could be done manually, for example, by a user pressing a "top-up" button on the processor; or it could be done automatically by the strain gauge system simply detecting that the overall weight of the silo has gone up from one day to the next.

The silo content monitoring system of the invention has a read-out device, which indicates the content of the silo. This can be a physical enclosure with a dial, screen, digital display, or LED bar graph or similar, which visually indicates the subtractive silo content weight estimate at any given time. Additionally or alternatively, the read-out device may comprise a wireless transceiver, which is adapted to output a signal indicative of the subtractive silo content weight estimate, which can be received by a cloud-based system or by an app/programme on a computer or smart phone, for example. In other words, the need for a physical, on-site read-out is not necessary since a signal indicative of the content of the silo can be sent wirelessly, which can be read from a different device, such as a smart phone, computer, or tablet-type device. The advantage of using a separate read-out device is that it permits additional data to be presented by way of a graphical user interface. This may include statistics about usage, data logs, predictions of silo content over time, ordering/top-up integrations, and so on.

Preferably, the signal indicative of the subtractive silo content weight estimate can be received by a supplier who can then use that reading to schedule a replenishment of the silo content, which can be based on the instantaneous weight measurement with a predicted future weight estimate for the silo. This facilitates "just-in-time" ordering and may also improve supply chain logistics since it would be possible for a feed supplier, for example, to perform regular top-ups, rather than waiting until the silo has been emptied before completely re-filling it. This provides the possibility of surplus supplies being distributed amongst several silos as the driver is "on their rounds" between farms.

A second aspect of the invention provides a silo content monitoring kit, which when fitted to a silo, provides the silo content monitoring system of any preceding claim, the kit comprising: a strain gauge and a set of fixings for retrofitting the strain gauge to a support strut of the silo; a motion sensor and a set of fixings or connections for retrofitting to the discharge tube so as to monitor movement of the auger; a read-out device; a central processing unit; and a wiring harness for connecting the strain gauge, motion sensor and read-out device to the central processing unit. The silo content monitoring kit may further comprise any one or more of the group consisting of: a mains power adapter; a mobile telephony interface; a wireless local area network interface (such as a WiFi®); a short-range wireless interface (such as a Bluetooth®); and a firmware dongle.

An embodiment of the invention shall now be described, by way of example only, with reference to the accompanying drawings in which.

Figure 1:
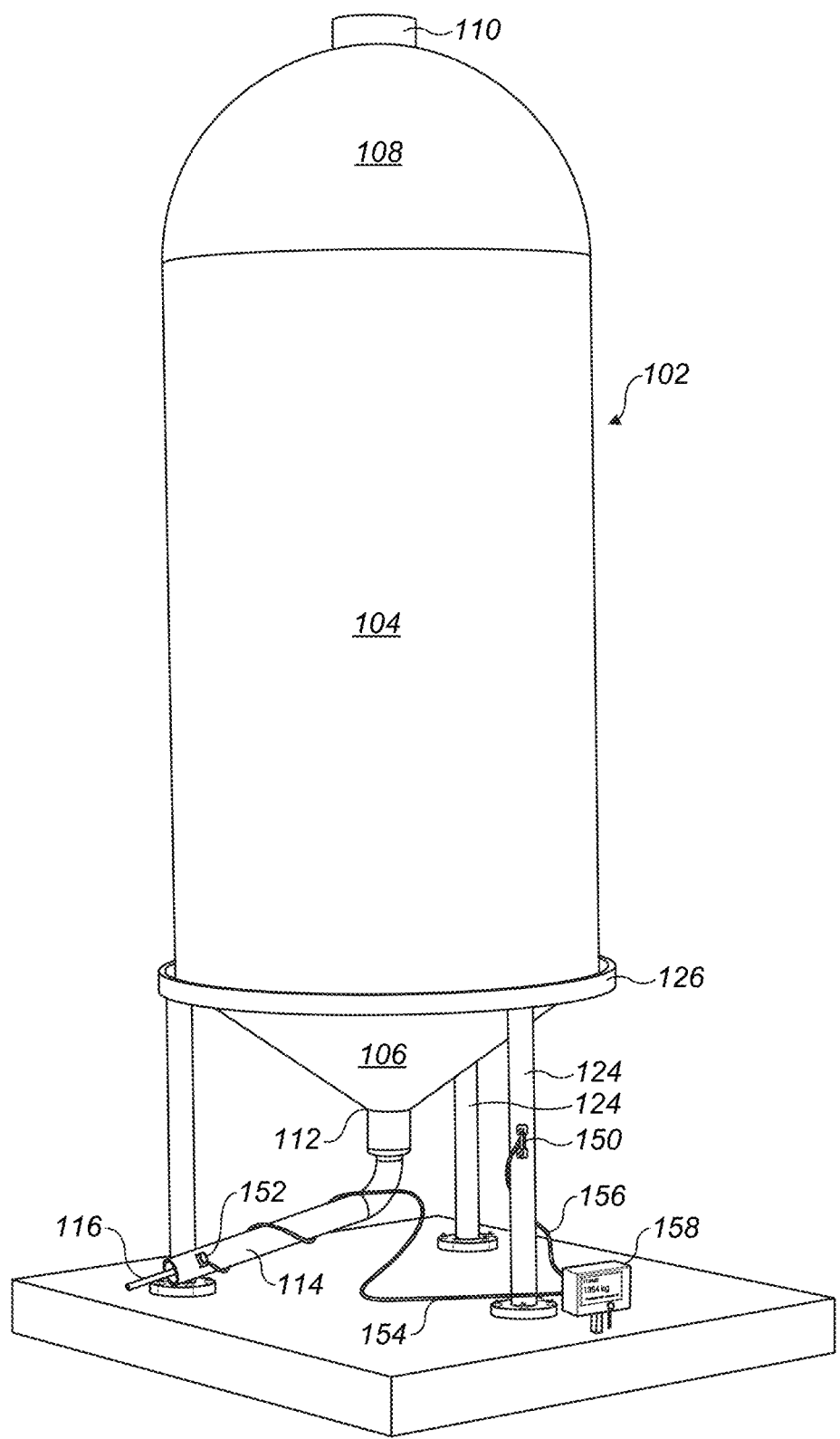
FIG. 1 is a schematic, perspective view of a silo fitted with a content monitoring system in accordance with the invention.
Figure 2:
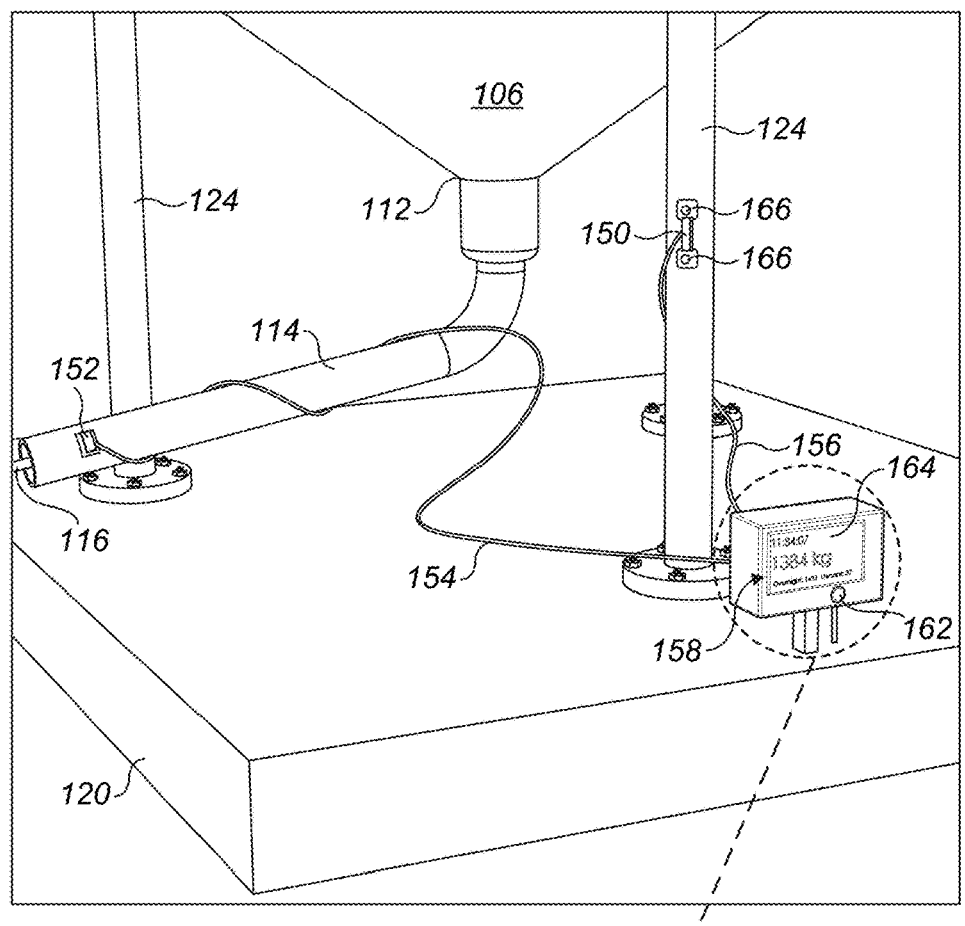
FIG. 2 is a close-up view of the base of the silo of FIG. 1.
Figure 3:
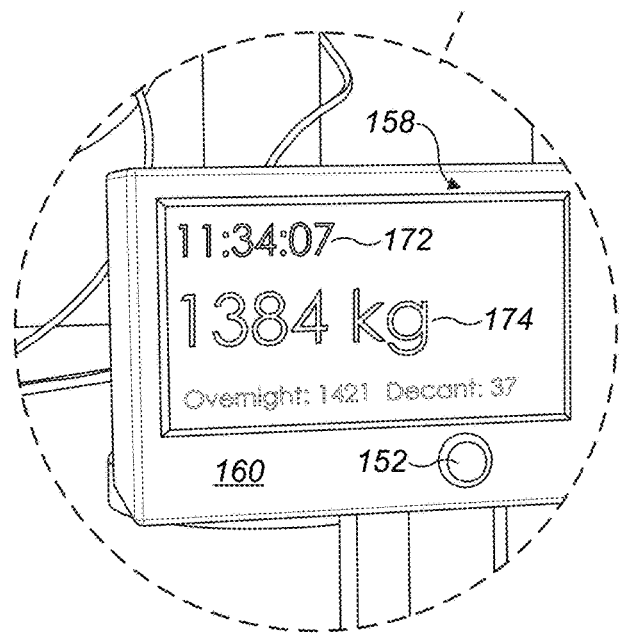
Figure 4:
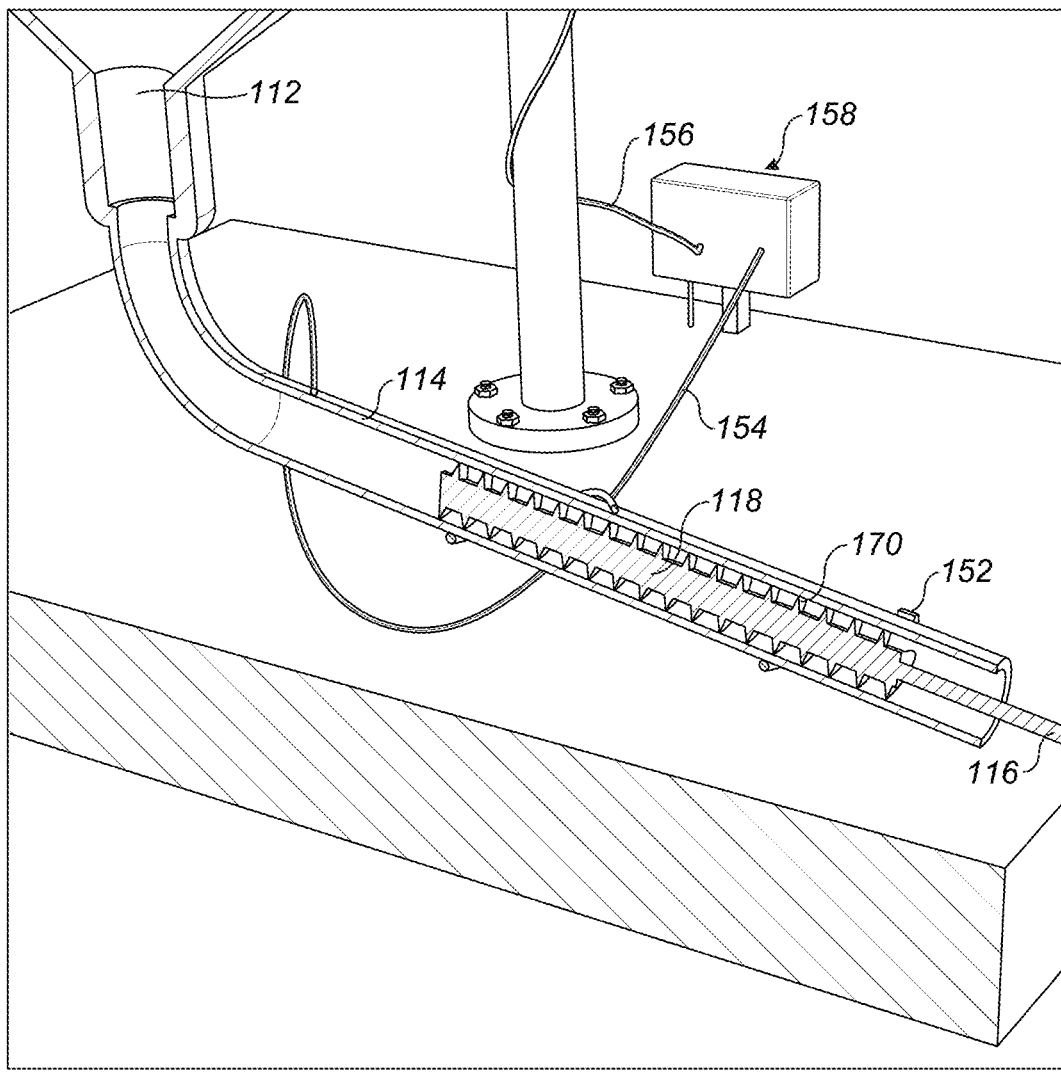
Figure 5:
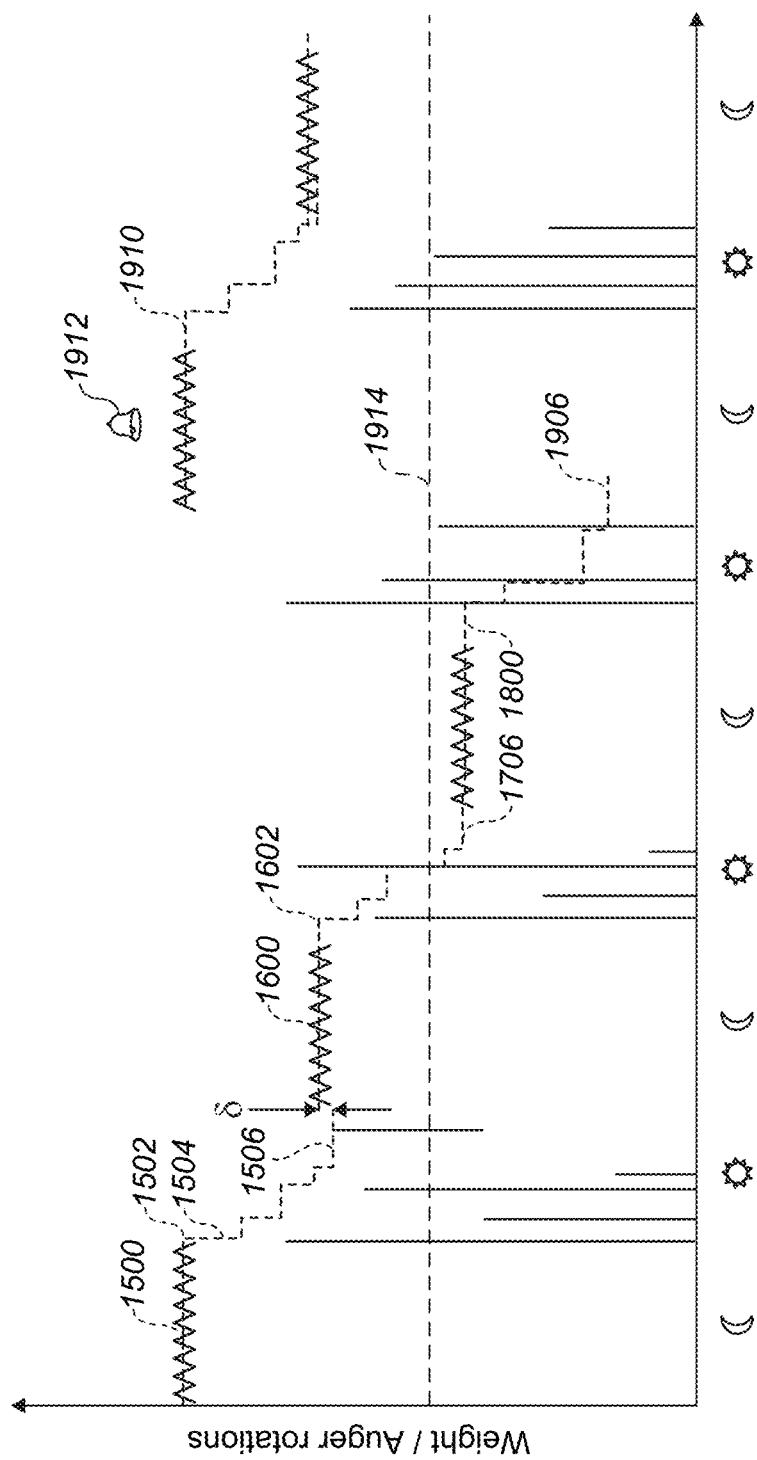

Inset FIG. 3 is an enlargement of the display shown in FIG. 2;

FIG. 4 is a partial, perspective, sectional view of the base of the silo as shown in FIG. 1; and FIG. 5 is a schematic reading output from the silo content measuring system previously described.

A silo content monitoring system 100 is shown in the drawings retrofitted to an in-situ silo 102, which is of the usual type. The silo 102 has a generally tubular shell 104, a truncated conical hopper 106 and a domed lid 108. The interior of the silo 102 can be filled with granular material via an inlet opening 110 at the top, via a conveyor (not shown for clarity). The content of the silo 102 can be decanted via an outlet aperture 112 located at the base of the hopper 106 and a discharge tube 114 is provided to direct the flow of granular material from the silo 102 into a collection vessel (not shown also for clarity) at the end of the discharge tube 114. A shaft 116 extends within the discharge tube 114 and drives an auger so that granular material can be pulled out of the silo in a controlled fashion. The shaft 116 is usually connected to a motor (not shown) such that by driving the motor, the shaft 116 is rotated, thereby rotating the auger 118 and withdrawing granular material via the Archimedean principle in a known manner.

In order to accommodate the hopper 106, the discharge tube 114 and the associated mechanical components 116, 118, the silo shell 104 is supported above a stable (usually concrete) base slab 120 using support struts 124 that hold-up a silo ring 126 upon which the shell 104 and hopper 106 sit. The weight of the silo 102 is therefore transferred into the base slab 120 via the struts 124 and the overall arrangement is stabilized, as shown, by bolting end flanges of the struts 124 down onto the concrete pad 120.

As can be seen in the drawings, the silo has been modified to include a content monitoring system, which is provided in the form of a retrofit kit.

The silo content of the monitoring system/kit comprises a strain gauge 150, which is affixed to one of the struts 124 of the silo 102; an auger rotation sensor 154, which is mounted on the discharge tube 114 to detect rotation of the auger 118 within it; a wiring arrangement 154, 156 that connects the strain gauge 152 and the auger movement sensor 152 to a mains-powered read-out display device 158.

As can be seen more clearly from FIGS. 2 and 3 of the drawings, the read-out device 158 comprises an IP-rated enclosure 160, with one or more control buttons 162 and a visual display 164, which is, in this example, an LCD or OLED display screen.

The strain gauge 150 is mechanically affixed to one of the struts by using screws or bolts, that affix pads of the strain gauge 150 to spaced-apart locations of the strut. As the strut changes dimensions under the affects of loading, the spacing between the screws 166, and hence the length of the strain gauge 150, will change (however infinitesimally) and this will be detected by the strain gauge—usually as a voltage or current output. The output signal from the strain gauge 150 feeds through a cable 156 into the circuitry (not shown) within the read-out device 158.

Similarly, the auger rotation sensor 152 has a part-cylindrical contact pad, which can be adhered to the corresponding cylindrical outer surface of the discharge tube 144 so as to fix it in position. It could, in certain circumstances, be affixed by using magnets, cable ties, a strap around the discharge tube or any other suitable means.

In the illustrated example, the auger rotation sensor 152 comprises an induction sensor, which detects movement of the flute 170 of the auger 118 as it moves past the sensor 152. As can be seen in FIG. 4, in particular, as the auger 118 is rotated, so the flute 170 will appear, to the sensor 152, to move in a left-to-right direction. Each time the flute 170 passes the sensor 152, due to its metallic construction, an induction effect is detected by the sensor 152, which sends a pulse signal along cable 154 to the circuitry of the read-out device 158.

As can be seen from FIG. 3 of the drawings, although various types of display may be used, it is useful for the system to provide the current time 172, which is useful to check that the system has synchronized correctly; as well as the estimated remaining content weight 174 of the silo 102. In this case, the estimated contents weigh 1,384 kg, and that is based on an overnight weight measurement of 1,421 kg (also shown on the screen 164), minus 37 revolutions of the auger 118 (also shown on the screen 164).

This is essentially a "dead reckoning" estimate given that the overnight weight of the contents of the silo was measured to be 1,221 kg and given that each revolution of the auger has been found to decant 1 kg of granular material. Deducting (37×1) from 1,421 gives the instantaneous estimate of 1,384 kg.

Turning now to FIG. 5 of the drawings, a schematic graph of the outputs of the sensors 150 and 152 is given as a function of time along the horizontal axis. As can be seen from FIG. 5, the time axis is divided into daytime and night time segments corresponding to the system/real-time clock of the device. A daytime/night time, cut-off is specified within the system software or firmware. The cut-off can, of course, be determined by actual sunrise and sunset hours as previously described, or it can be a fixed parameter.

Starting from the left of FIG. 5, it can be seen that the strain gauge 150 has been used to obtain overnight strain gauge readings 1500, which have been plotted on the graph. Given that there will inevitably be some variation in that reading overnight, an average value 1502 of the various overnight readings 1500 is taken to be the "overnight weight" of the silo. This total weight can be deducted from the tear weight of the silo 102 to obtain the weight of the contents within it.

During a daytime interval, moving to the right in FIG. 5, the strain gauge readings are either not taken at all (which may be useful to conserve power) or are ignored for the reasons aforesaid (namely lack of reliability during day time hours). During daytime hours, however, the rotations of the auger 118 are counted and are plotted also. The vertical lines in FIG. 5 represent, relatively, the number of rotations of the auger 118 throughout the daytime periods.

In the previously-described example, each rotation of the auger equated to 1 kg of dispensed material, so by carrying out a subtraction from the overnight average 1502, a running tally of the silo content weight can be maintained. As can be seen by looking at FIG. 5 of the drawings, the average overnight weight 1500 decreases step-wise for each rotation or part-rotation of the auger 118, as detected by sensor 152. The estimated instantaneous content weight of the silo is the running total of the overnight weight minus any deductions. At the end of the day, an expected overnight weight reading 1506 is obtained by "dead reckoning".

Then, during the night time hours, the strain gauge 150 is reactivated and further measurements 1600 are taken to obtain a new average overnight silo content weight measurement 1602. Here, it can be seen that there is a difference between the end-of-day estimate 1506 and the actual reading 1602, which results in a difference 8 as indicated by the step change in the dash line of FIG. 5. This indicates that the "1 kg per rotation of the auger" estimate used previously is slightly inaccurate, namely that it is over-estimating the amount of material decanted per revolution of the auger 118. Accordingly, the system carries out an interpolation so as to adjust the weight decanted per revolution (for example, to 0.9 kg per rotation) and this updated value, or calibrated value, is used in the subsequent day.

As can be seen from FIG. 5 of the drawings, by using an updated or recalibrated value based on the previous day's or days' readings, the end-of-day reading 1706 in the subsequent day or days, corresponds more accurately to the measured overnight weight 1800. This indicates that the calibration has been successful and so the dead reckoning values going forward are likely to be more accurate.

On day 4, in this hypothetical example, the silo 102 has been re-filled. This means that at the end of the third day, the end-of-day dead reckoning estimate 1906 is vastly lower than the measured overnight weight 1910 on the subsequent night. This difference cannot be accounted for by a lack of calibration, so it is interpreted as a re-fill and a note 1912 is placed in a log file to indicate this.

Any calibration or running average that may have been used prior to the re-fill may need to be discarded going forward due to variations in the granular material being introduced into the silo during the re-filling process. This could be accounted for, for example, by using a different type or brand of material, its water content and packing factor, etc., which could have an effect on the rate of decanting per rotation of the auger 118. In this case, recalibration may be necessary over subsequent days to bring the dead reckoning values back in-line with the actual content weight within the silo 102.

By keeping a log file of the overnight weight readings as well as the rotations of the auger and any significant events, such as re-fills, it is possible to use the data collected by the system for monitoring and quality control purposes. It can be used, in particular, to detect changes in usage of the granular material, such as feed, to obtain an indication of a loss or increase in appetite of farm animals. This sort of information may be useful from a veterinary/husbandry point of view.

Moreover, it enables the interrogation of the data to pick-up trends or defects in the use of the silo content.

For example, on day 3 in FIG. 5, it can be seen that only 3 feeds were given, whereas on other days, 4 feeds were given. It can also be seen that the overall amount of feed dispensed on day 4 is slightly less than the feed dispensed on days 1 and 2, and this could be useful information. The lack of an afternoon feed on day 3 could be accounted for by the refilling causing the silo to be out of operation for a period of time, or it could equally be due to staff shortages or negligence on the farm.

A further advantage of the invention is that it enables a user to set a threshold value 1914 below which, if the dead reckoning weight of the silo 102 falls below, ordering is automatically triggered. In the example shown in FIG. 5, the threshold value was reached during the third feed on day 2, and this triggered a re-fill order, which arrived 2 days later. This type of information can be extremely useful from a logistical and planning perspective as well.

The invention is not restricted to the details of the foregoing embodiment, which is merely illustrative of one possible embodiment of the invention.

The invention claimed is:

1. A silo content monitoring system for a silo,
the silo comprising: a shell; a hopper; an outlet aperture located at or towards the base of the hopper; a discharge tube connected to the outlet aperture; a rotatable auger located within the discharge tube; and a plurality of support struts for supporting the shell, hopper, and outlet aperture above ground level,
the silo content monitoring system comprising:
a strain gauge affixed to at least one of the support struts;
a motion sensor adapted to detect rotation of the auger relative to the discharge tube; and
central processing unit comprising: a calculating means; a real-time clock; an input/output interface connected to the strain gauge, the motion sensor and to a read-out device, wherein
the central processing unit is adapted to:
in operation, during a night time interval, to monitor an output of the strain gauge to ascertain an overall weight of the silo, subtract a tare weight from the overall weight to obtain an overnight silo content weight measurement;
in operation, during a daytime interval, to monitor an output of the motion sensor and for each rotation or part-rotation of the auger, calculate an estimated dispensed weight; and
in operation, to output, via the read-out device, a subtractive silo content weight estimate being the overnight silo content weight measurement, minus the estimated dispensed weight.

2. The silo content monitoring system of claim 1, comprising a strain gauge affixed to more than one of the support struts, the overnight silo content weight measurement being based on a function of the outputs of the strain gauges.

3. The silo content monitoring system of claim 2, wherein the function comprises a geometric mean or an arithmetic mean.

4. The silo content monitoring system of claim 1, wherein the motion sensor comprises an encoder affixed to a drive shaft of the auger and/or to a rotor of a motor driving the auger.

5. The silo content monitoring system of claim 1, wherein the motion sensor comprises a current sensor connected to a power cable of a motor driving the auger.

6. The silo content monitoring system of claim 1, wherein the motion sensor comprises an induction sensor adapted to detect the rotation of the auger within the discharge tube.

7. The silo content monitoring system of claim 1, wherein the night time interval is a period of a 24-hour day commencing at or after sunset and ending before or at sunrise, and the daytime interval is a reminder of the 24-hour period.

8. The silo content monitoring system of claim 7, wherein the start and end of the night time interval are fixed programmable, or user-inputted, times within the 24-hour period.

9. The silo content monitoring system of claim 7, wherein the start time and end time of the night time interval are dynamic variables based on actual sunset and sunset times for a given location of the silo.

10. The silo content monitoring system of claim 1, wherein the central processing unit is further adapted, in use, to recalibrate the estimated dispensed weight per rotation or part-rotation of the auger by:
ascertaining a difference between the overnight silo content weight measurement on a first day and the overnight silo content weight measurement on a second day;
ascertaining the number of rotations or part-rotations of the auger between the first day and the second day;
dividing the overnight silo content weight measurement difference by the number of rotations or part-rotations of the auger to obtain a calibrated value of the weight dispensed per rotation or part-rotation of the auger; and
using the calibrated value of the weight dispensed per rotation or part-rotation of the auger in future subtractive silo content weight estimates.

11. The silo content monitoring system of claim 10, wherein the first day and the second day are between 1 and 5 days apart.

12. The silo content monitoring system of claim 10, wherein the recalibration is repeated at intervals so as to obtain a rolling average of the calibrated value of the weight dispensed per rotation or part-rotation of the auger.

13. The silo content monitoring system of any of claim 10, wherein the rolling average is reset if the overnight silo content weight measurement on a given day is greater than the overnight silo content weight measurement on a preceding day.

14. The silo content monitoring system of claim 1, wherein the read-out device comprises a dial, screen, digital display, or LED bar graph visually indicating the subtractive silo content weight estimate.

15. The silo content monitoring system of claim 1, wherein the read-out device comprises a wireless transceiver adapted in use, to output a signal indicative of the subtractive silo content weight estimate, which signal can be interpreted and viewed by a user via a web-based portal, or via an app of a smartphone or tablet computing device.

16. The silo content monitoring system of claim 15, wherein a GUI of the web-based portal or app presents a log of silo content use and replenishment metrics and events.

17. The silo content monitoring system of claim 15, wherein the signal indicative of the subtractive silo content weight estimate is receivable by a supplier who can schedule a replenishment of the silo contents based on an instantaneous subtractive silo content weight estimate or a predicted future subtractive silo content weight estimate.

18. A silo content monitoring kit for a silo comprising:
a shell;
a hopper;

an outlet aperture located at or towards the base of the hopper;
a discharge tube connected to the outlet aperture;
a rotatable auger located within the discharge tube; and
a plurality of support struts for supporting the shell, hopper, and outlet aperture above ground level, the silo content monitoring kit comprising:
a strain gauge and a set of fixings for retrofitting the strain gauge to a support strut of the silo;
a motion sensor and a set of fixings or connections for retrofitting to the discharge tube of the silo so as to monitor movement of the auger;
a read-out device;
a central processing unit with a calculating means, a real-time clock, and an input/output interface connected to the strain gauge, the motion sensor and the read-out device; and
a wiring harness for connecting the strain gauge, motion sensor and read-out device to the central processing unit, which when fitted to the silo is configured such that:

during a night time interval, the central processing unit is adapted to monitor an output of the strain gauge to ascertain an overall weight of the silo, subtract a tare weight from the overall weight to obtain an overnight silo content weight measurement;

during a daytime interval, the central processing unit is adapted to monitor an output of the motion sensor and for each rotation or part-rotation of the auger, calculate an estimated dispensed weight; and the central processing unit is adapted to output, via the read-out device, a subtractive silo content weight estimate being the overnight silo content weight measurement, minus the estimated dispensed weight.

19. The silo content monitoring kit of claim 18, further comprising any one or more of the group consisting of: a mains power adapter; a mobile telephony interface; a wireless local area network interface; a short-range wireless interface; and a firmware dongle.

* * * * *